United States Patent
Jaenker

(10) Patent No.: US 9,708,074 B2
(45) Date of Patent: Jul. 18, 2017

(54) AUXILIARY DRIVE SYSTEM FOR A HELICOPTER

(71) Applicant: Airbus Defence and Space GmbH, Ottobrunn (DE)

(72) Inventor: Peter Jaenker, Riemerling (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 124 days.

(21) Appl. No.: 14/416,764

(22) PCT Filed: Jul. 19, 2013

(86) PCT No.: PCT/DE2013/000394
§ 371 (c)(1),
(2) Date: Jan. 23, 2015

(87) PCT Pub. No.: WO2014/015847
PCT Pub. Date: Jan. 30, 2014

(65) Prior Publication Data
US 2015/0197343 A1  Jul. 16, 2015

(30) Foreign Application Priority Data

Jul. 26, 2012 (DE) ........................ 10 2012 014 751

(51) Int. Cl.
*B64D 41/00* (2006.01)
*B64D 35/02* (2006.01)
(Continued)

(52) U.S. Cl.
CPC ............ *B64D 35/02* (2013.01); *B64C 27/006* (2013.01); *B64C 27/12* (2013.01); *B64D 41/00* (2013.01); *B64C 2027/125* (2013.01)

(58) Field of Classification Search
CPC ....... B64C 27/006; B64C 27/12; B64C 27/14; B64C 2027/125; B64D 41/00; B64D 35/02
See application file for complete search history.

(56) References Cited

U.S. PATENT DOCUMENTS 2,394,513 A   2/1946  De Chappedelaine
4,609,165 A   9/1986  Logan et al.
(Continued)

FOREIGN PATENT DOCUMENTS

DE   10 2004 033 039 A1   2/2006
DE   10 2009 058 695 A1   6/2011
(Continued)

OTHER PUBLICATIONS

International Search Report (PCT/ISA/220 and PCT/ISA/210) dated Nov. 7, 2013 with English translation (eight pages).
(Continued)

*Primary Examiner* — Philip J Bonzell
(74) *Attorney, Agent, or Firm* — Crowell & Moring LLP

(57) ABSTRACT

A drive system for a helicopter includes a main drive for driving a rotor the helicopter, a flywheel mass battery including at least one flywheel, a first transmission coupling the flywheel mass battery with the main drive such that, during operation of the main drive, output can be transferred from the main drive to the flywheel mass battery, and a second, variable transmission connecting the flywheel mass battery to the rotor of the helicopter such that a predetermined output can be transferred to the rotor through adjustment of a transmission ratio of the variable transmission.

12 Claims, 2 Drawing Sheets

(51) Int. Cl.
*B64C 27/00* (2006.01)
*B64C 27/12* (2006.01)

(56) References Cited

U.S. PATENT DOCUMENTS

| | | | |
|---|---|---|---|
| 7,296,767 B2 | 11/2007 | Palcic et al. | |
| 8,757,542 B2* | 6/2014 | Hopdjanian | B60L 3/0046 |
| | | | 244/53 R |
| 9,180,964 B2* | 11/2015 | Smith | B64C 27/006 |
| 2002/0145076 A1* | 10/2002 | Alford | B64C 27/006 |
| | | | 244/60 |
| 2005/0178893 A1 | 8/2005 | Miller et al. | |
| 2011/0154805 A1* | 6/2011 | Heathco | F01D 15/10 |
| | | | 60/226.1 |
| 2012/0025032 A1* | 2/2012 | Hopdjanian | B60L 3/0046 |
| | | | 244/53 R |

FOREIGN PATENT DOCUMENTS

| | | |
|---|---|---|
| DE | 10 2011 014 098 A1 | 12/2011 |
| EP | 0 753 456 A1 | 1/1997 |
| EP | 1 038 766 A2 | 9/2000 |
| EP | 1 247 736 A1 | 10/2002 |
| GB | 2 447 641 A | 9/2008 |
| JP | 10-264895 A | 10/1998 |

OTHER PUBLICATIONS

German-language Written Opinion (PCT/ISA/237) dated Nov. 7, 2013 (six pages).
German Office Action dated Dec. 12, 2012 (five pages).

* cited by examiner

AUXILIARY DRIVE SYSTEM FOR A HELICOPTER

FIELD OF THE INVENTION

Exemplary embodiments of the invention relate to a helicopter with a drive system, a method for operating an auxiliary drive system of a helicopter, and a controller for an auxiliary drive system of a helicopter.

BACKGROUND OF THE INVENTION

An emergency landing of a helicopter in the event of a turbine failure is performed according to the autorotation method. This method requires comprehensive training of the pilot and can be critical in a given flight situation and environment.

For this reason, certain helicopters are equipped with assistance systems based on a battery-powered electrical auxiliary drive. Such an assistance system makes a landing possible that is controlled to a large extent. As a result of the battery and motor technology, the costs and weight of this assistance system are very high.

Moreover, auxiliary drives are known that are based on a flywheel. For example, US patent document U.S. Pat. No. 4,609,165 discloses a helicopter in which a flywheel is used as an auxiliary power system.

A drive assembly for an automobile in which a detachable flywheel is integrated is described in German patent document DE 102009058695 A1. German patent document DE 102011014098 A1 describes a flywheel generator. A hybrid drive of an automobile with a flywheel as an energy store is known from German patent document DE 102004033039 A1. European patent document EP 1247736 A1 describes an aircraft in which motor output is used to rotate mechanical energy storage means. A power transmission device for helicopters is known, for example, from European patent document EP 0753456A1.

SUMMARY OF THE INVENTION

Exemplary embodiments of the invention improve an auxiliary drive system for a helicopter with a flywheel generator such that a presettable output can be transferred to the rotor.

A helicopter according to the invention can comprise a main rotor and a tail rotor or even several main rotors. For example, the helicopter is a single-engine helicopter with a single drive.

According to one embodiment of the invention, the drive system of the helicopter comprises a main drive for driving a rotor; a flywheel mass battery comprising at least one flywheel; a first transmission coupling the flywheel mass battery to the main drive such that, during operation of the main drive, power can be transferred from the drive to the flywheel mass battery; and a second, variable transmission connecting the flywheel mass battery to the rotor of the helicopter such that a predetermined output can be transferred to the rotor through adjustment of a transmission ratio of the variable transmission.

In other words, the drive of the helicopter comprises a conventional main drive, such as a turbine, for instance, and an auxiliary drive system comprising a fly-wheel mass battery as an energy store and drive element. The flywheel mass battery can be charged with power by purely mechanical means during normal operation of the main drive via the first transmission. If the main drive is to be supported, or if the main drive has failed, the rotational energy stored in the flywheel mass battery can be used to drive the rotor. To enable adjustment of the power transferred from the flywheel mass battery to the rotor, the auxiliary drive system comprises a variable, i.e., adjustable transmission.

According to one embodiment of the invention, the variable transmission comprises a continuously variable transmission. For example, the variable transmission is a belt transmission in which a belt or a chain runs between two pairs of cone pulleys. By changing the spacing of the cone pulleys of a pair of cone pulleys, the transmission ratio of the transmission can be adjusted. Other types of continuously variable transmissions are possible, however, such as hydrodynamic transmissions.

According to one embodiment of the invention, the variable transmission can be controlled electrically. The variable transmission can comprise actuators (electric motors) by means of which the transmission ratio of the variable transmission can be adjusted using an electrical controller. In this way, the desired transmission ratio can be detected and adjusted by the controller.

According to one embodiment of the invention, the first transmission comprises a transmission with a fixed transmission ratio. The first transmission can be a simple pinion gear designed to translate the rotational speed delivered by the main drive during normal operation to a maximum rotational speed of the flywheel of the flywheel mass battery.

According to one embodiment of the invention, the drive system further comprises a freewheel unit between the first transmission and the main drive. In other words, the auxiliary drive system is coupled with the primary drive train. In this way, a blocked or slowly rotating main drive can be prevented from drawing energy from the flywheel mass battery.

According to one embodiment of the invention, the drive system further comprises a main transmission between the main drive and the rotor. The main transmission has a first input with which the main drive is coupled. Moreover, the main transmission has a second input with which the flywheel mass battery is coupled via the variable transmission. In this way, the operation of the rotor via the main drive and the operation of the rotor via the flywheel mass battery con be completely uncoupled from each other. Mechanical output can be fed in a controlled manner via the controlled variable transmission into the second input of the main transmission.

According to one embodiment of the invention, the drive system further comprises a drive shaft by means of which the main drive is coupled with the first input of the main transmission. The first transmission can also be coupled with this drive shaft in order to transfer a portion of the output of the main drive to the flywheel mass battery.

According to one embodiment of the invention, the drive shaft is coupled via a freewheel unit with the main transmission. The freewheel unit ensures that a slowly rotating main drive is uncoupled from the main transmission. As a result, it is also ensured that a defective, blocked main drive does not impede the rotor.

According to one embodiment of the invention, the drive system further comprises an auxiliary drive shaft by means of which the variable transmission is coupled with the second input of the main transmission. The auxiliary drive shaft can be coupled via a freewheel unit with the main transmission. This freewheel unit can be used to ensure that only output from the flywheel mass battery to the rotor can be transferred, but not in the other direction.

In other words, the helicopter comprises a drive system comprising a mechanical auxiliary drive system in which energy from the main drive can be transferred in a purely mechanical manner from the main drive to the auxiliary drive system and from the auxiliary drive system to the rotor.

According to the invention, the method for operating an auxiliary drive system of a helicopter comprises the steps: determining whether a main drive of the helicopter is providing the desired output; if the main drive is not providing the desired output, connecting a flywheel mass battery to a rotor of the helicopter by means of a variable transmission, flywheel mass battery having been charged mechanically by the main drive during normal operation; and controlling a transmission ratio of the variable transmission such that a desired output is transferred to the rotor.

If it is determined that the main drive, due to a defect, for example, is no longer providing the desired output or has failed completely, the energy stored in an auxiliary drive system can be used to continue driving the rotor. The auxiliary drive system comprises a flywheel mass battery, a first transmission for charging the flywheel mass battery via the main drive, and a second variable transmission for coupling the flywheel mass battery with the rotor.

The auxiliary drive system and particularly the flywheel mass battery can be charged by the main drive via the first transmission at startup. During normal operation of the main drive, small power losses of the main drive can be compensated.

Upon failure of the main drive, both the main transmission and the auxiliary drive system are uncoupled from the still or braking main drive by means of freewheel units.

The auxiliary drive system can be used as an emergency landing system for a helicopter. For this purpose, it can support the pilot while landing the helicopter with a defective or failed main drive.

According to one embodiment of the invention, the method further comprises the steps: determining whether the rotor is being operated in autorotation; and if the rotor is being operated in autorotation, separating of the flywheel mass battery from the rotor. The operation of the rotor with the auxiliary drive system can be interrupted when the rotor is being operated in autorotation.

According to one embodiment of the invention, the method further comprises the steps: determining whether a landing procedure is being initiated; if a landing procedure is being initiated, connecting the flywheel mass battery to the rotor. Right before the helicopter touches down, the auxiliary drive system can be used to (automatically) introduce additional rotational energy into the rotor in order to slow the descent of the helicopter.

The controller according to the invention for an auxiliary drive system of a helicopter is designed to execute the method as described above and below. The controller can be an electronic controller, for example.

For example, the controller can receive information from a control system about the current performance of the main drive or at least its rotational speed in order to deduce from this whether the main drive is providing the desired output or is defective. The controller can be regarded as a control system for the output control of the helicopter in several phases of flight, such as normal operation, autorotation or landing.

The flywheel mass battery can also comprise sensors that detect its current rotational speed and then report it to the controller. Using these data, the controller can determine the required transmission ratio of the variable transmission.

Moreover, the controller can receive information from the control system of the helicopter as to whether the pilot has put the rotor in autorotation and/or whether the pilot has begun with the landing procedure. Using these data, the controller can then detach the variable transmission from the rotor or couple it appropriately with the rotor as desired.

Exemplary embodiments of the invention are described in detail below with reference to the enclosed figures.

BRIEF DESCRIPTION OF THE FIGURES

In principle, identical or similar parts are provided with the same reference symbols.

DETAILED DESCRIPTION OF EXEMPLARY EMBODIMENTS

Figure 1:
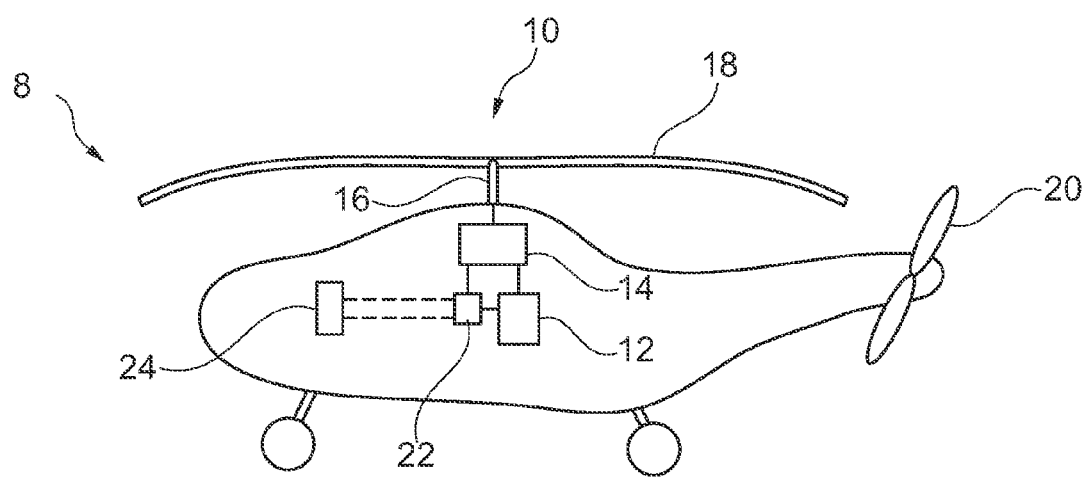
FIG. 1 shows a schematic view of a helicopter according to an embodiment of the invention.

FIG. 1 shows a helicopter 8 comprising a drive system 10 with a conventional main drive 12. The main drive 12 can comprise a combustion engine, such as a turbine or a piston engine, for example.

The main drive 12 is coupled via a main transmission 14 with a rotor shaft 16 or a rotor mast 16 to the end of which a rotor 18 of the helicopter 10 is attached. In FIG. 1, the helicopter 10 is depicted as a helicopter with a main rotor 18 and a tail rotor 20. It will readily be understood that the helicopter 10 can have more than one lift-generating rotor 18 and also need not comprise a tail rotor 20.

The helicopter 10 has a mechanical auxiliary drive system 22 designed to feed output to the main transmission 14 in the event the main drive 12 fails. For this purpose, the helicopter 10 has a controller 24 designed to detect a failure of the main drive 12 and to control the auxiliary drive system 22 appropriately.

Figure 2:
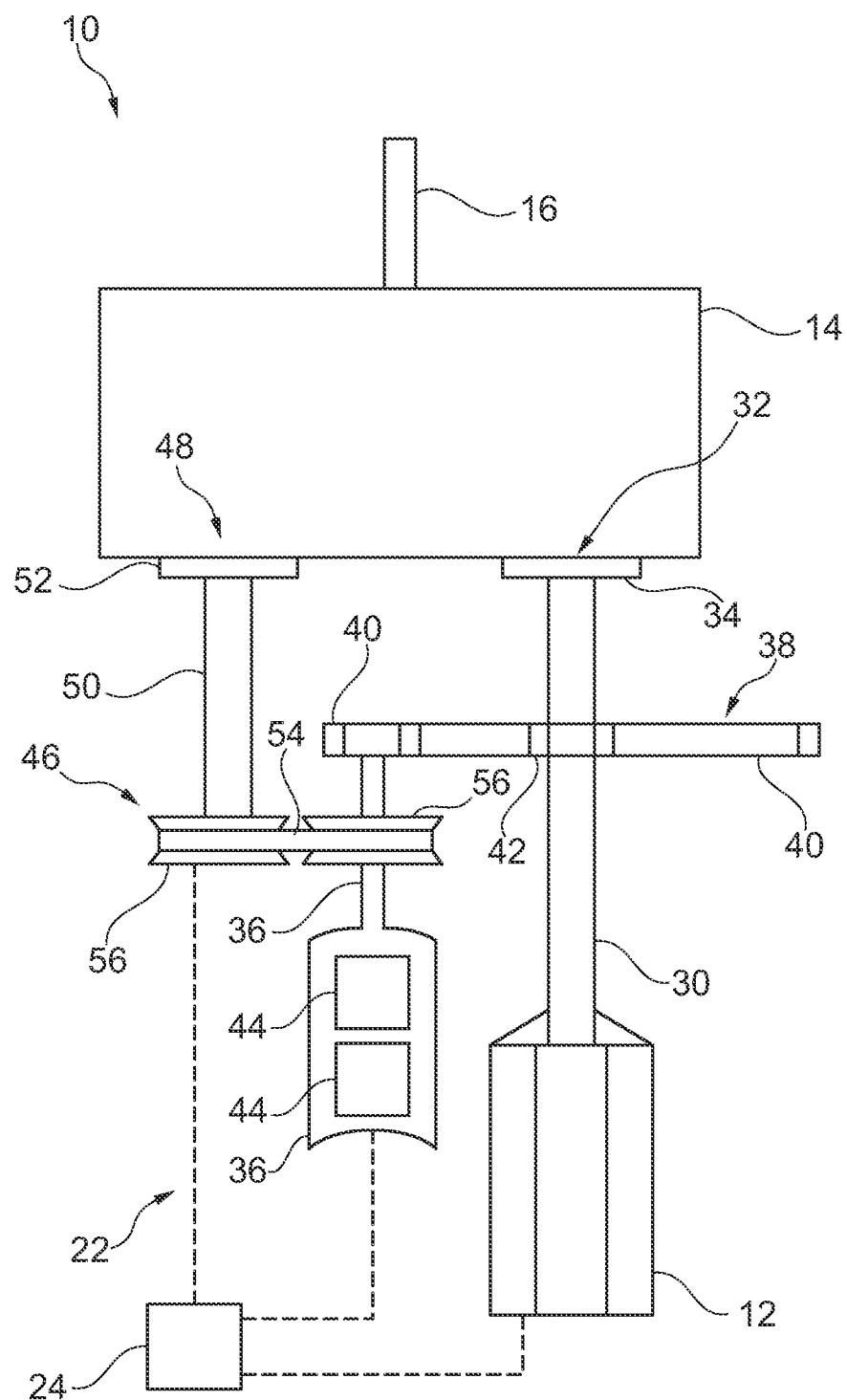
FIG. 2 shows a schematic view of a drive system of a helicopter according to an embodiment of the invention.

FIG. 2 shows a section from FIG. 1 with the drive system 10 and shows, in particular, the auxiliary drive system 22 in more detail.

The main drive 12, for example a turbine 12, is coupled via a shaft 30 with a first input 32 of the main transmission 14. Located between the input 32 and the shaft 30 is a freewheel unit 34, which can transfer torque from the turbine 12 or the shaft 30 to the main transmission 14 but, conversely, prevents torque from being transferred from the transmission to the main drive 12.

The auxiliary drive system 22 comprises a flywheel mass battery 36, which is coupled via a shaft 30 with an auxiliary transmission 38 that is coupled at its other end with the shaft 30 and hence with the main drive 12. The auxiliary transmission 38 can be a transmission with a fixed transmission ratio and comprise two pinions 40, for example.

A freewheel unit 42 is arranged between the auxiliary transmission 38 and the shaft 30, the freewheel unit 42 is designed to transfer torque from the shaft 30 or the main drive 12 to the auxiliary transmission 38 and hence to the flywheel mass battery 36 but, conversely, prevents torque from being transferred from the flywheel mass battery 36 to the main drive 12.

In this way, output can be transferred from the main drive 12 to the flywheel mass battery 36 when the main drive 12 is running. During normal operation of the helicopter 10, a first portion of the output generated by the main drive 12 is transferred via the freewheel unit 34 to the main transmission 14 and used to drive the rotor 18 of the helicopter 10. Another, second portion of the output (which is usually smaller than the first portion) is transferred via the auxiliary transmission 38 to the flywheel mass battery 36 in order to cause the flywheel masses to rotate, that is, to charge the flywheel mass battery 36, and also to compensate for frictional losses in the flywheel mass battery 36.

If the main drive 12 fails, the flywheel mass battery 36 can continue to rotate without output being transferred back to the main drive 12.

To store the energy, the flywheel mass battery 36 can have one or more flywheels 44. It is possible for the flywheel mass battery 36 to merely comprise one flywheel 44, but several and/or counter-rotating flywheels 44 are also possible.

The auxiliary drive system 22 further comprises a variable transmission 46 by means of which the flywheel mass battery 36 is coupled with the second input 48 of the main transmission 14. An input of the variable transmission 46 is connected to the shaft 30, which is rigidly connected to the flywheel mass battery 36. The other input of the transmission 46 is connected to a shaft 50, which is coupled via a freewheel unit 52 with the second input 48 of the main transmission.

The freewheel unit 52 is designed to transfer torque from the variable transmission 46 to the main transmission 14 but to prevent torque from being transferred from the main transmission 14 to the variable transmission 46 and hence to the flywheel mass battery 36.

By virtue of the two freewheel units 34 and 52, either the main drive 12 or the fly-wheel mass battery 36 (or both) can input torque into the main transmission 14. Conversely, through the freewheel units 34 and 52 the main drive 12 and the fly-wheel mass battery 36 are prevented from mutually impeding each other, for example if the main drive 12 has failed.

The variable transmission 46 can be a continuously variable transmission 46 comprising cone pulleys 56 mechanically connected by means of a chain 54 or belt 54, for example. By changing the spacing of the cone pulleys 56, the transmission and transfer ratio of the transmission 46 can be adjusted in a stepless manner.

The adjustment of the transmission ratio of the transmission can be done by means of the controller 24, which controls corresponding actuators of the variable transmission 46, for example. This controller can also be designed to detect the current rotational speed of the flywheels 44 and the operating mode (defect/normal operation) of the main drive 12.

Figure 3:
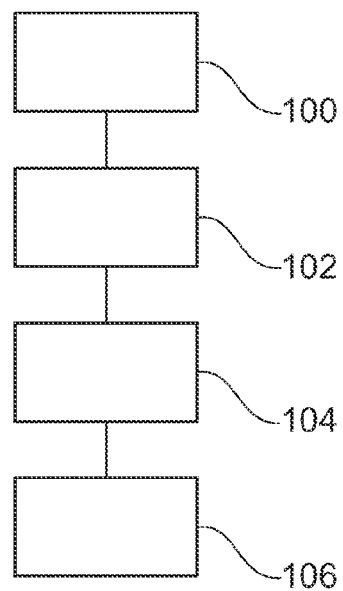
FIG. 3 shows a flowchart for a method for operating an auxiliary drive system of a helicopter according to an embodiment of the invention.

FIG. 3 shows a method for controlling the auxiliary drive system 22 which can be carried out from the controller 24.

In step 100, the controller 24 detects a failure or a defect of the main drive 12. A corresponding signal can be provided by a main drive controller of the drive 12, for example.

In step 102 output is introduced from the auxiliary drive system 22 in a transition phase between the detection of the defect and the beginning of autorotation. For this purpose, the controller 24 adjusts the transmission ratio of the variable transmission 46 such that the desired output is transferred from the flywheel mass battery 36 to the rotor. For this purpose, the controller 24 can determine the current rotational speed of the flywheel mass battery 36.

If the main drive is not rotating or not rotating with sufficient speed, the main drive 12 is uncoupled by means of the freewheel unit 34 from the main transmission 14 and by means of the freewheel unit 42 from the flywheel mass battery 36. Continuing to step 102, the flywheel mass battery 36 is coupled via the variable transmission 46 with the main transmission 14 and is adjusted by the controller 24 such that the desired output is introduced into the second input 48 of the main transmission 48.

In step 104, the rotor 18 transitions to autorotation and the auxiliary drive system 22 is adjusted so as not to introduce any output. For this purpose, the pilot sets the rotor 18 to autorotation, which is detected by the controller 24, for example by means of a corresponding signal from a control system of the helicopter 8. Upon detection of the signal, the controller 24 adjusts the variable transmission 46 such that no more output is transferred to the rotor 18.

In step 106, the landing procedure of the helicopter 8 is initiated and the auxiliary drive system 22 is set so as to introduce output again. The landing procedure is initiated by the pilot by moving the rotor 18 out of the autorotation position into a landing position in which the energy stored in the rotor and transmission is used to brake the helicopter 8. This switchover can be detected by the controller 24, for example through a corresponding signal from the control system of the helicopter 8. After that, the controller 24 sets the variable transmission 46 (analogously to step 102) again such that the desired output is introduced into the second input 48 of the main transmission 14 in order to additionally drive the rotor 18.

To enable estimation of how a flywheel mass battery and its flywheel could be dimensioned, the following formulas can be used:

| | |
|---|---|
| Kinetic rotational energy | $W_{rot} = \frac{1}{2} \cdot J \cdot \omega^2$ |
| Torque of a flywheel as a massive cylinder (a cylindrical shell has twice the torque.) | $J = \frac{1}{2} \cdot m \cdot R^2$ |
| Energy density of the flywheel | $\frac{W_{rot}}{m} = \frac{R^2 \cdot \omega^2}{4} = \left(\frac{R \cdot \omega}{2}\right)^2$ |
| Circumferential speed | $v_u = R \cdot \omega$ |
| Energy density | $\frac{W_{rot}}{m} = \frac{v_u^2}{4}$ |

This results in the following values for various materials.

| | Strength (MPa) | Density (kg/m³) | Specific strength (MPa/kg) | Maximum energy density (MJ/kg) |
|---|---|---|---|---|
| Steel | 1700 | 7800 | 0.22 | 0.11 |
| Aluminum | 600 | 2700 | 0.22 | 0.11 |
| Titanium | 1200 | 4500 | 0.27 | 0.13 |
| CFRP | 3200 | 2000 | 1.6 | 0.8 |

Despite their low mass density, high-strength materials such as CFRP (carbon fiber-reinforced plastics), for instance, can be used as the material for the flywheel. Metals and metal alloys are also suitable materials.

By comparison, lithium batteries have an energy density of 200 Wh/kg, which corresponds to 0.72 MJ/kg.

An EC120-type helicopter has a power input of about 100 kW. For 30 s, this corresponds to an energy requirement of 3 MJ. The energy density of CFRP is 800 kJ/kg, which yields a flywheel weight of 3.75 kg.

Assuming a factor of 4 for additional components (bearings, housing), one obtains a mass for the flywheel mass battery of about 15 kg. For the other components of the auxiliary drive system as well (first transmission, variable transmission, actuators, control, etc.), a weight of 15 kg can be assumed. For the auxiliary drive system, this results in a total weight of 30 kg.

In addition, it should be pointed out that "comprising" does not exclude any other elements or steps, and "one" or "a" does not exclude the plural. Furthermore, it should be noted that features or steps that have been described with reference to one of the above exemplary embodiments can also be used in combination with other features or steps of other exemplary embodiments described above. Reference symbols in the claims are not to be regarded as a restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A helicopter with a drive system, comprising:
   a main drive configured to drive a lift-generating rotor of the helicopter;
   a flywheel mass battery comprising at least one flywheel;
   a first transmission coupling the flywheel mass battery to the main drive such that, during operation of the main drive, output is transferred from the main drive to the flywheel mass battery;
   a second, variable transmission connecting the flywheel mass battery to the lift-generating rotor of the helicopter such that a predetermined output is transferred to the lift-generating rotor through adjustment of a transmission ratio of the variable transmission; and
   a main transmission between the main drive and the lift-generating rotor,
   wherein the main transmission comprises a first input with which the main drive is coupled,
   wherein the main transmission has a second input with which the flywheel mass battery is coupled via the variable transmission.

2. The helicopter with a drive system of claim 1, wherein the variable transmission is a continuously variable transmission.

3. The helicopter with a drive system of claim 1, wherein the variable transmission is electrically controlled.

4. The helicopter with a drive system of claim 1, wherein the first transmission is a transmission with a fixed transmission ratio.

5. The helicopter with a drive system of claim 1, further comprising:
   a freewheel unit between the first transmission and the main drive.

6. The helicopter with a drive system of claim 1, further comprising:
   an auxiliary drive shaft via which the variable transmission is coupled with the second input of the main transmission,
   wherein the auxiliary drive shaft is coupled via a freewheel unit with the main transmission.

7. The helicopter with a drive system of claim 1, further comprising:
   a drive shaft via which the main drive is coupled with the first input of the main transmission.

8. The helicopter with a drive system of claim 7, wherein the drive shaft is coupled via a freewheel unit with the main transmission.

9. The helicopter with a drive system of claim 7, wherein the first transmission is coupled with the drive shaft.

10. A method for operating an auxiliary drive system of a helicopter, the method comprising the steps:
    determining whether a main drive of the helicopter is providing a desired output;
    when the main drive is not providing the desired output, connecting of a flywheel mass battery to a lift-generating rotor of the helicopter via a variable transmission, the flywheel mass battery having been charged mechanically by the main drive during normal operation;
    controlling of a transmission ratio of the variable transmission such that a desired output is transferred to the lift-generating rotor; and
    separating operation of the lift-generating rotor via the main drive from operation of the lift-generating rotor via the flywheel mass battery by a first input and a second input of a main transmission, wherein the first input is coupled with the main drive and the second input is coupled via the variable transmission with the flywheel mass battery.

11. The method of claim 10, further comprising the steps:
    detecting whether the lift-generating rotor is being operated in autorotation; and
    separating of the flywheel mass battery from the lift-generating rotor when it is detected that the lift-generating rotor is being operated in autorotation.

12. The method of claim 10, further comprising the steps:
    detecting whether a landing procedure is being initiated;
    connecting of the flywheel mass battery to the lift-generating rotor when it is detected that a landing procedure is being initiated.

* * * * *